J. S. STONE.
APPARATUS FOR DETERMINING THE DIRECTION OF SPACE TELEGRAPH SIGNALS.
APPLICATION FILED APR. 15, 1909.

961,265.

Patented June 14, 1910.
2 SHEETS—SHEET 1.

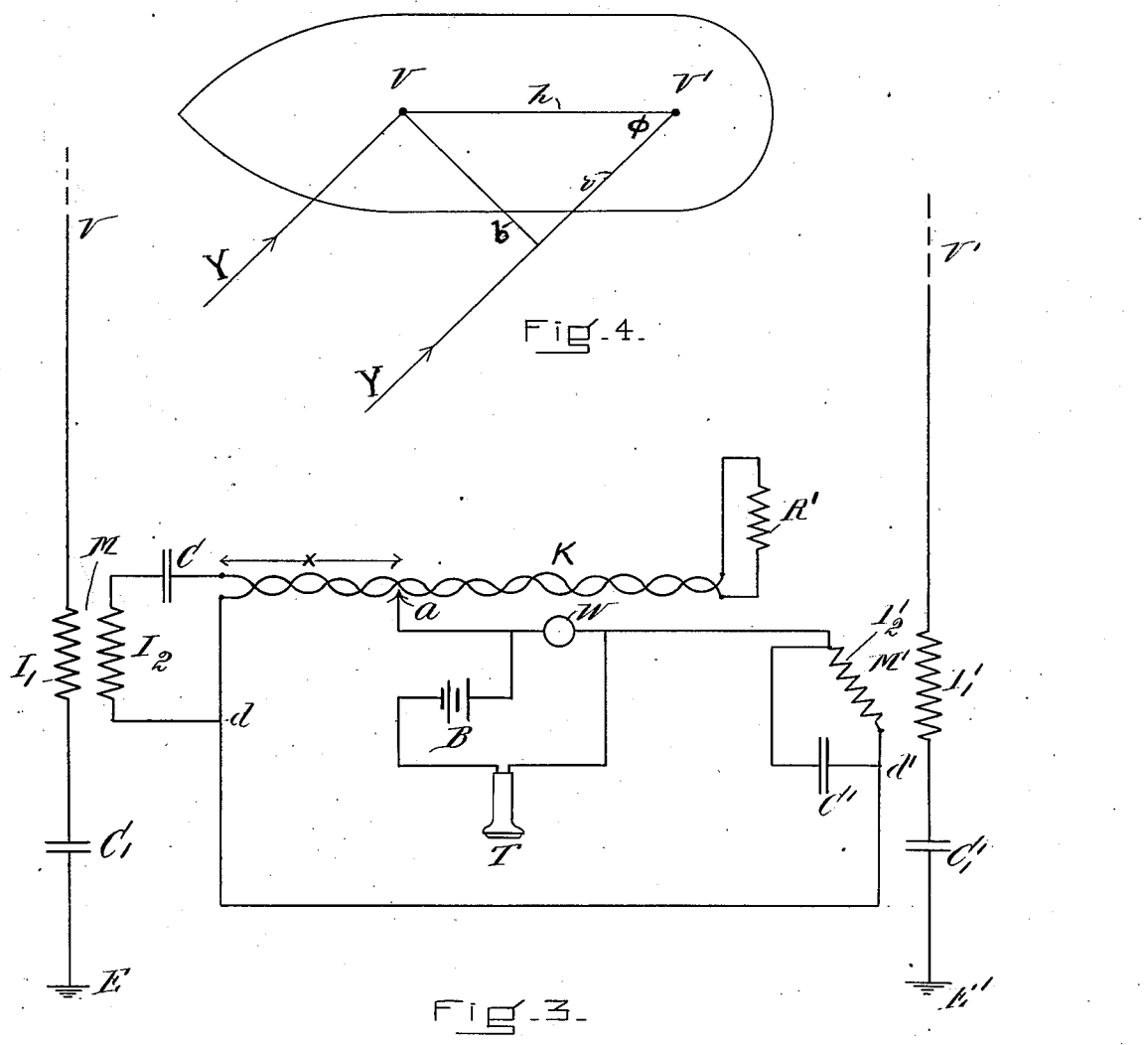

UNITED STATES PATENT OFFICE.

JOHN STONE STONE, OF BOSTON, MASSACHUSETTS.

APPARATUS FOR DETERMINING THE DIRECTION OF SPACE-TELEGRAPH SIGNALS.

961,265.      Specification of Letters Patent.      Patented June 14, 1910.

Application filed April 15, 1909. Serial No. 490,134.

*To all whom it may concern:*

Be it known that I, JOHN STONE STONE, a citizen of the United States, and a resident of Boston, in the county of Suffolk and State of Massachusetts, have invented a new and useful Improvement in Apparatus for Determining the Direction of Space-Telegraph Signals, of which the following is a specification.

My invention relates to improvements in apparatus for determining the direction of space telegraph signals and its object is to provide such apparatus whereby the direction from which the electromagnetic waves emanate may be determined without changing the position of the elevated receiving conductors relatively to the direction of motion of said waves as is necessary in employing the apparatus set forth in my Letters Patent No. 716,135, dated December 16, 1902.

In carrying out my invention I employ two separated elevated receiving conductors, the separation thereof having no relation to the length of the wave to be received, each provided with a receiving circuit and an electrical system which I shall hereinafter designate "an artificial line" associated with one or both of said receiving circuits, so that by suitable adjustment of the connection or connections of an oscillation detector with respect to one or both of said artificial lines, the response of said detector to the oscillations developed in the elevated conductors will be reduced to a minimum or rendered zero.

The drawings which accompany and form a part of this specification represent in diagrammatic form several systems embodying the principle of my invention.

Figure 1:
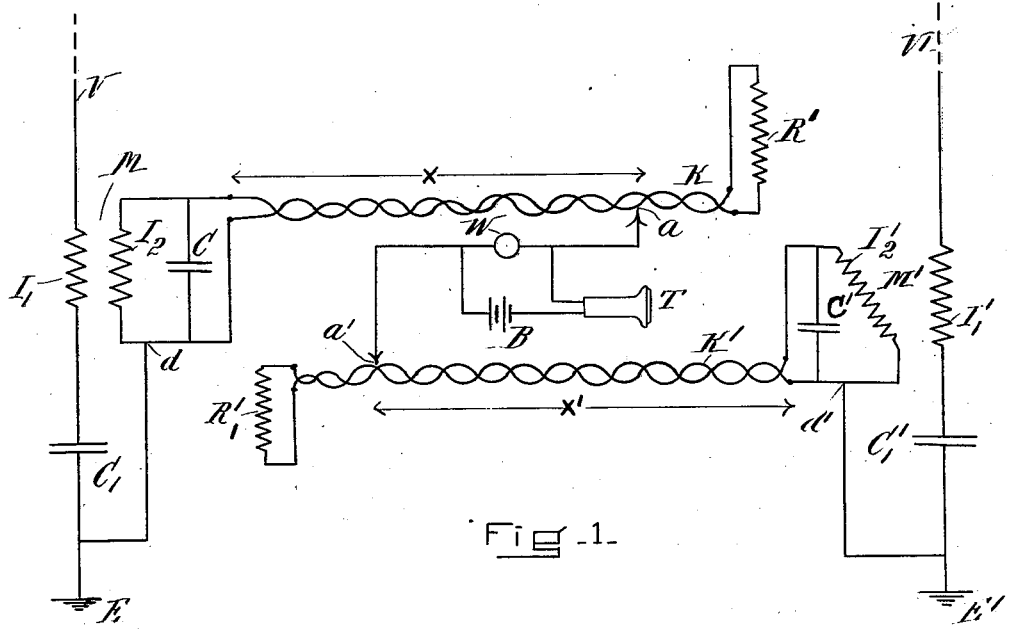
Figure 2:
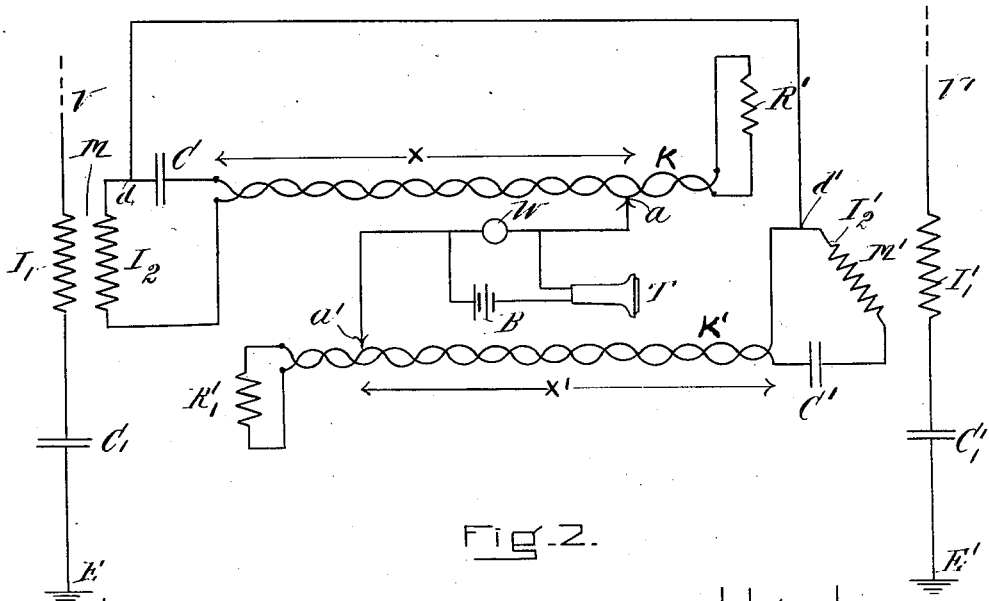

In the drawings Figures 1 and 2 are diagrams representing direction-finder systems each employing two artificial lines; Fig. 3 represents a direction-finder system employing one artificial line, and Fig. 4 is a diagram representing a ship provided with two antennæ and employed for more fully explaining the theory of my invention.

In the figures—V V' are elevated receiving conductors.

E E' are earth connections.

M is a transformer of which the primary $I_1$ and secondary $I_2$ are fixed.

M' is a transformer of which the secondary $I_2'$ is movable with respect to the primary $I_1'$.

C C' $C_1$ $C_1'$ are condensers.

W is an oscillation detector.

B is a battery.

T is a signal indicating device such as a telephone.

R' $R_1'$ are resistances.

K K' are artificial lines, or slow speed conductors having distributed inductances $l$ per unit of length and distributed capacity $c$ per unit of length, such for example as those referred to in my Letters Patent No. 802,424, dated October 24, 1905.

The condensers $C_1$ $C_1'$ may be employed to adjust the elevated conductors to the frequency $n$ of the waves to be received. The non-inductive resistances R' $R_1'$ may be employed to prevent terminal reflection and when $$v = \frac{1}{\sqrt{lc}},$$

where $v$ is the velocity of propagation, $$R' \text{ and } R_1' = \sqrt{\frac{l}{c}}.$$

When the terminal resistances R' $R_1'$ are relatively large as shown in Fig. 1, the condensers C C' may be connected in shunt, and when as shown in Fig. 2 said terminal resistances are relatively small, the condensers may be connected in series with the secondaries of the transformers M M'.

If periodic forces of equal amplitudes and of frequency $n$ act upon the two elevated conductors, the amplitudes of the forces at any points as $a$ and $a'$ on K and K' may be made equal by adjusting the relative values of the mutual inductances M M', as by adjusting the position of the secondary $I_2'$ or the secondary $I_2$ or both, without disturbing the phase relation between the forces at $a$, $a'$. If two periodic forces equal in amplitude and frequency, but differing in phase by an angle $\theta$ act separately and simultaneously upon the elevated conductors V V', the phases of the forces at the points $a$ and $a'$, when $x = x'$, will differ by the same angle $\theta$, but by adjusting the contact $a$ or the contact $a'$, or both, relative to each other, points on K and K' may be found where said forces are in phase. The conductors K K' may therefore be calibrated and furnished with a scale from which readings of the values of $x-x'$ determined as above will give the value of $\theta$ for frequency $n$, and for other frequencies the readings may be multiplied by a constant to give the values of $\theta$. Having determined the value of $\theta$, the angle between the line joining the elevated conductors and the point from which the waves emanate may be found, and accordingly the said scale may be calibrated to give said angle directly.

Assuming that the elevated conductors V V' are located on shipboard, the procedure for determining the direction of emanation of electromagnetic waves from a distant point is as follows: First, adjust one of the contacts as $a'$ with respect to the other until a minimum response in the receiver T is obtained. Second, adjust one of the transformers as M' by varying the position of one of its windings until a minimum of the said minimum is obtained. Third, readjust the contact $a'$ with respect to $a$ until a further minimum is obtained, and then if necessary readjust M' until a further reduction in the response of the receiver is obtained. When such minimum of response is obtained, the scale will give the angle $\phi$ and the bearing of the ship with respect to the point of emanation of the waves is obtained.

The conditions for a balance or minimum response in the receiver are (1) $E_0 \epsilon^{-ax} = E_1 \epsilon^{-ax'}$ and (2) $\theta - \beta x' = -\beta x$, where $e_x = E_0 \epsilon^{-ax} \cos(pt - \beta x)$ is the force at $x$ and $e_x' = E_1 \epsilon^{-ax'} \cos(pt - \beta x' + \theta)$ is the force at $x'$ and where $E_0$ and $E_1$ are the amplitudes of the forces at the terminals of $I_2$ and $I_2'$ respectively, $a$ and $\beta$ are constants hereinafter defined, $a$ being the attenuation constant and $\beta$ being the space-phase constant, and $p = 2\pi n$.

Condition (1) may be obtained by giving the ratio $$\frac{M'}{M}$$

the proper value without affecting condition (2). Condition (2) may be obtained by giving $x-x'$ the proper value without affecting condition (1). When conditions (1) and (2) are realized the response of the receiver will be *nil*.

Referring to Fig. 4 in which the lines Y Y represent the direction from which the waves acting upon the elevated conductors emanate, $r$ the difference in travel between the waves which impinge upon the conductor V' and those which impinge upon the conductor V, $h$ the distance between said conductors, $\phi$ the angle between Y and $h$, and $b$ a line from V perpendicular to $r$, we have $$r = h \cos \phi,$$
$$b = h \sin \phi,$$
$$\lambda = \frac{v}{n} = \frac{2\pi v}{p},$$
$$\frac{h \cos \phi}{2\pi v} p = \frac{r}{\lambda} = \frac{\theta}{2\pi}.$$
$$\therefore \theta = \frac{h \cos \phi}{v} p$$

and $$\phi = \cos^{-1} \frac{v\theta}{hp}.$$

When $\phi = 0$, $\theta = h\frac{p}{v}$.

When $\phi = \frac{\pi}{2}$, $\theta = 0$.

When $\phi = \pi$, $\theta = h\frac{p}{v}$.

When $\phi = \frac{3}{2}\pi$, $\theta = 0$.

When $\phi = 2\pi$, $\theta = h\frac{p}{v}$.

The proof of the operation of the system with continuous trains of simple harmonic waves follows:—Let the current in the coils $I_1$ and $I_1'$ be respectively $I \sin pt$ and $I_1 \sin(pt+\theta)$. The induced electromotive forces will be $e^0 = IMp \cos pt$ and $e_1 = I_1 M' p \cos(pt+\theta)$.

For very high frequencies such as occur in wireless telegraphy, the "sending-end impedances" or the impedances at the origin ($x = 0$, $x' = 0$) of the conductors K and K' will be non-inductive and of magnitudes $$R' = R_1' = \sqrt{\frac{l}{c}}.$$

For very high frequencies such as occur in wireless telegraphy, the impedances of the coils $I_2$ and $I_2'$ will be practically $Lp$ and $L_1 p$, and therefore the currents in the coils $I_2$ and $I_2'$ will be $$i_0 = \frac{IMp}{\sqrt{L^2 p^2 + R'^2}} \cos\left(pt - \tan^{-1} \frac{Lp}{R'}\right)$$

and $$i_1 = \frac{I_1 M' p}{\sqrt{L_1^2 p^2 + R_1'^2}} \cos\left(pt + \theta - \tan^{-1} \frac{L_1 p}{R_1'}\right),$$

respectively.

The electromotive forces at the terminals of said coils will be $$e_0' = \frac{IMpR'}{\sqrt{L^2 p^2 + R'^2}} \cos\left(pt - \tan^{-1} \frac{Lp}{R'}\right)$$

and $$e_1' = \frac{I_1 M' p R_1'}{\sqrt{L_1^2 p^2 + R_1'^2}} \cos\left(pt + \theta - \tan^{-1} \frac{L_1 p}{R_1'}\right),$$

respectively.

The electromotive forces at the points $x$ and $x'$ will be $$e_x = \frac{IMpR'}{\sqrt{L'^2p^2+R'^2}}\varepsilon^{-\alpha x}\cos.\left(pt - \tan^{-1}\frac{L'p}{R'} - \beta x\right)$$

and $$e_{x'}' = \frac{I_1M'pR_1'}{\sqrt{L_1'^2p^2+R_1'^2}}\varepsilon^{-\alpha x'}\cos.$$

$$\left(pt - \tan^{-1}\frac{L_1 p}{R_1'} - \beta x' + \theta\right)$$

respectively.

Condition (1) for a balance therefore becomes $$IM\varepsilon^{-\alpha x} = I_1 M'\varepsilon^{-\alpha x'}$$

or $$\frac{M'}{M} = \frac{I\varepsilon^{-\alpha x}}{I_1\varepsilon^{-\alpha x'}}$$

or, when $$I = I_1, \quad \frac{M'}{M} = \frac{\varepsilon^{-\alpha x}}{\varepsilon^{-\alpha x'}}.$$

Condition (2) for a balance therefore becomes $$\beta x = \beta x' - \theta$$

or $$\theta = \beta(x' - x).$$

In these expressions $$\alpha = \sqrt{\frac{cp}{2}}\sqrt{\sqrt{\rho^2 + l^2p^2} - lp},$$

where $\rho$ is the resistance per unit length of the conductors K and K$^1$, and $$\beta = \sqrt{\frac{cp}{2}}\sqrt{\sqrt{\rho^2 + l^2p^2} + lp}.$$

For very high frequencies $$\alpha = \frac{\rho}{2}\sqrt{\frac{c}{l}}$$

and $$\beta = \sqrt{clp^2}.$$

If further we have the relation $$\frac{1}{v} = \sqrt{cl},$$

then $$\alpha = \frac{\rho}{2lv}$$

and $$\beta = \frac{p}{v}.$$

Condition (1) therefore becomes, for $I = I_1$, $$\frac{M'}{M} = \frac{\varepsilon^{-\frac{\rho x}{2lv}}}{\varepsilon^{-\frac{\rho x'}{2lv}}},$$

and condition (2) becomes $$\theta = \frac{p}{v}(x' - x),\text{---}$$

therefore $$\phi = \cos^{-1}\frac{x' - x}{h}$$

if the $v$ in the artificial lines is the same as that of the waves.

When $\phi = 0$, $h = x' - x$.

When $\phi = \frac{\pi}{2}$, $x' = x$.

When $\phi = \pi$, $h = x - x'$.

When $\phi = \frac{3}{2}\pi$, $x' = x$.

It will be understood that when the waves are not continuous but are transmitted in trains and when they are not simple harmonic, the foregoing equations will be suitably modified in accordance with the logarithmic decrement and that the method of procedure above outlined still applies.

The condensers C and C' are employed to tune the receiving circuits which include the secondaries $I_2$ $I_2'$ to the frequency of the waves the energy of which is to be received.

In the system shown in Fig. 3 where only one artificial line K associated with one of the receiving circuits is employed and the oscillation detector is operatively associated with said artificial line and with the other receiving circuit, a point $x$ on the artificial line may be found at which the response of the receiver is a minimum. In this case the procedure above outlined of varying the mutual inductance M' and the position of the contact $a$ will be followed.

The system represented in Fig. 3, as well as those shown in Figs. 1 and 2, comprises as its salient features two electrical systems, each associated with a different one of the elevated receiving conductors, and means for balancing both the phases and the amplitudes of the currents developed by electromagnetic waves in said systems with respect to the oscillation-detector without changing the positions of the elevated receiving conductors relatively to the direction of motion of said waves.

It will be understood that my invention as hereinbefore described may be subjected to a wide range of variation without departing from the principles underlying the same. The points $d$ $d'$ may if desired be earthed, as in Fig. 1, or conductively connected by a line wire as in Figs. 2 and 3.

I claim:

1. An apparatus for determining the direction of space telegraph signals comprising two separated elevated receiving conductors, two receiving circuits each associated with a different one of said elevated receiving conductors, two artificial lines each connected with a different one of said receiving circuits and an oscillation-detector connected with said artificial lines.

2. An apparatus for determining the direction of space telegraph signals comprising two separated elevated receiving conductors, two receiving circuits each associated with a different one of said elevated receiving conductors, an artificial line connected with one of said receiving circuits and an oscillation-detector operatively associated with said artificial line and with the other of said receiving circuits.

3. An apparatus for determining the direction of space telegraph signals comprising two separated elevated receiving conductors, two electrical systems each associated with a different one of said elevated receiving conductors, an oscillation-detector operatively associated with said electrical systems, and means for balancing the phases and amplitudes of the currents developed by electromagnetic waves in said systems with respect to said oscillation-detector without changing the positions of said elevated receiving conductors relatively to the direction of motion of said electromagnetic waves.

4. An apparatus for determining the direction of space telegraph signals comprising a plurality of separated elevated receiving conductors, an oscillation detector, means for conveying the oscillations developed by the received waves from said elevated conductors to said oscillation detector and means for so varying the phases and amplitudes, of said oscillations so conveyed to said oscillation detector as to cause them to neutralize each other in their effect upon said detector.

In testimony whereof, I have hereunto subscribed my name this 12th day of April 1909.

JOHN STONE STONE.

Witnesses:
GEO. K. WOODWORTH,
E. B. TOMLINSON.

---

Corrections in Letters Patent No. 961,265.

It is hereby certified that in Letters Patent No. 961,265, granted June 14, 1910, upon the application of John Stone Stone, of Boston, Massachusetts, for an improvement in "Apparatus for Determining the Direction of Space-Telegraph Signals," errors appear in the printed specification requiring correction as follows: Page 1, line 64, after the word "inductances" the numeral "1" (unity) should read $l$ (letter); page 3, line 4, the last symbol in the equation preceding "$\beta x$" for the sign $=$ read $-$; same page, line 37, the equation $$\beta = \sqrt{\frac{cp}{2}} \ \sqrt{\rho^2 + l^2 p^2} + lp \quad \text{should read} \quad \beta = \sqrt{\frac{cp}{2}} \sqrt{\sqrt{\rho^2 + l^2 p^2} + lp};$$

and that the said Letters Patent should be read with these corrections therein that the same may conform to the record of the case in the Patent Office.

Signed and sealed this 5th day of July, A. D., 1910.

[SEAL.]

F. A. TENNANT,
*Acting Commissioner of Patents.*